United States Patent
Gowdra

(10) Patent No.: US 8,495,033 B2
(45) Date of Patent: Jul. 23, 2013

(54) DATA PROCESSING

(75) Inventor: Vijay Muthugadooru Gowdra, Kamataka (IN)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 13/044,634

(22) Filed: Mar. 10, 2011

(65) Prior Publication Data

US 2012/0233224 A1    Sep. 13, 2012

(51) Int. Cl.
- *G06F 7/00* (2006.01)
- *G06F 17/00* (2006.01)
- *G06F 17/30* (2006.01)
- *G06F 3/06* (2006.01)

(52) U.S. Cl.
CPC ........ *G06F 17/30303* (2013.01); *G06F 3/0652* (2013.01); *G06F 2212/7205* (2013.01); *Y10S 707/956* (2013.01)
USPC ............ 707/692; 707/778; 707/829; 707/956

(58) Field of Classification Search
CPC ........ G06F 17/30303; G06F 2212/7205; G06F 3/0652
USPC .......................... 707/648, 692, 778, 829, 956
See application file for complete search history.

(56) References Cited

U.S. PATENT DOCUMENTS

| | | | |
|---|---|---|---|
| 5,581,749 A * | 12/1996 | Hossain et al. | 707/E17.032 |
| 6,535,949 B1 * | 3/2003 | Parker | 711/103 |
| 7,370,272 B2 | 5/2008 | Brodersen et al. | |
| 7,895,528 B2 * | 2/2011 | Keohane et al. | 715/807 |
| 2004/0081091 A1 * | 4/2004 | Widmer et al. | 370/230 |
| 2006/0031781 A1 * | 2/2006 | Keohane et al. | 715/807 |
| 2007/0112834 A1 | 5/2007 | Farr et al. | |
| 2007/0168388 A1 * | 7/2007 | Plastina et al. | 707/104.1 |
| 2007/0214058 A1 * | 9/2007 | Rouhi et al. | 705/26 |
| 2007/0220065 A1 | 9/2007 | Coyle et al. | |
| 2007/0239807 A1 | 10/2007 | Morgan | |
| 2007/0266003 A1 * | 11/2007 | Wong et al. | 707/3 |
| 2009/0106090 A1 * | 4/2009 | Rouhi et al. | 705/10 |
| 2009/0132920 A1 * | 5/2009 | Deyo et al. | 715/708 |
| 2009/0183244 A1 * | 7/2009 | Saraf et al. | 726/6 |
| 2010/0114987 A1 | 5/2010 | Tahiliani et al. | |
| 2010/0318831 A1 * | 12/2010 | Scott et al. | 713/600 |
| 2011/0208696 A1 * | 8/2011 | Pang | 707/610 |
| 2011/0265109 A1 * | 10/2011 | Goyet et al. | 725/9 |

* cited by examiner

*Primary Examiner* — Phong Nguyen

(57) ABSTRACT

Disclosed is a method for identifying inactive objects in an entity. The inactive objects may be purged from an entity to reduce the size of the entity.

12 Claims, 3 Drawing Sheets

DATA PROCESSING

BACKGROUND

Embodiments of the invention relates to data processing.

In many data processing projects and applications, a large number of objects are used. Objects are for example instances of classes or are complex data structures containing data elements, other data structures, and member methods. As time progresses and programmers change, many of these data objects become inactive. These data objects may become inactive because they are no longer needed, or because they are replaced by more current objects or by objects that, for one reason or another, are better for an application. These data objects that are no longer being used or become unnecessary may adversely affect or interfere with the operation of a computer or data processing system. For example, inactive objects may prevent optimal use of a memory, and may affect maintenance of the computer or data processing system. In some long running applications, these files containing objects may accumulate large numbers of custom, inactive objects. These objects increase the sizes of the files, referred to as making the files fat. The inactive objects also may affect maintenance and may prevent memory optimization.

BRIEF SUMMARY

Embodiments of the invention provide a method, system and computer program product for purging objects that are inactive in nature for example from a file to thereby producing a thinner file. Inactive objects are first identified within an entity, wherein the entity comprises a number of objects or elements related to the objects. When the inactive objects are purged, the corresponding elements are dynamically purged. In one embodiment a log file may be generated, wherein information on the inactive objects removed from the entity are recorded.

In one embodiment, the all of the custom inactive objects from the specified entity are removed and a check is made to determine if each of the objects to be purged is custom and inactive, and all of the custom inactive objects are eventually purged and a new entity is generated which has only active objects of the entity, which may contain newly added objects to the entity.

In one embodiment, the object within the entity may include a parent and children relationship, when one parent object becomes custom and inactive, that parent object and all of its children objects are purged from the object file.

DETAILED DESCRIPTION

Figure 1:
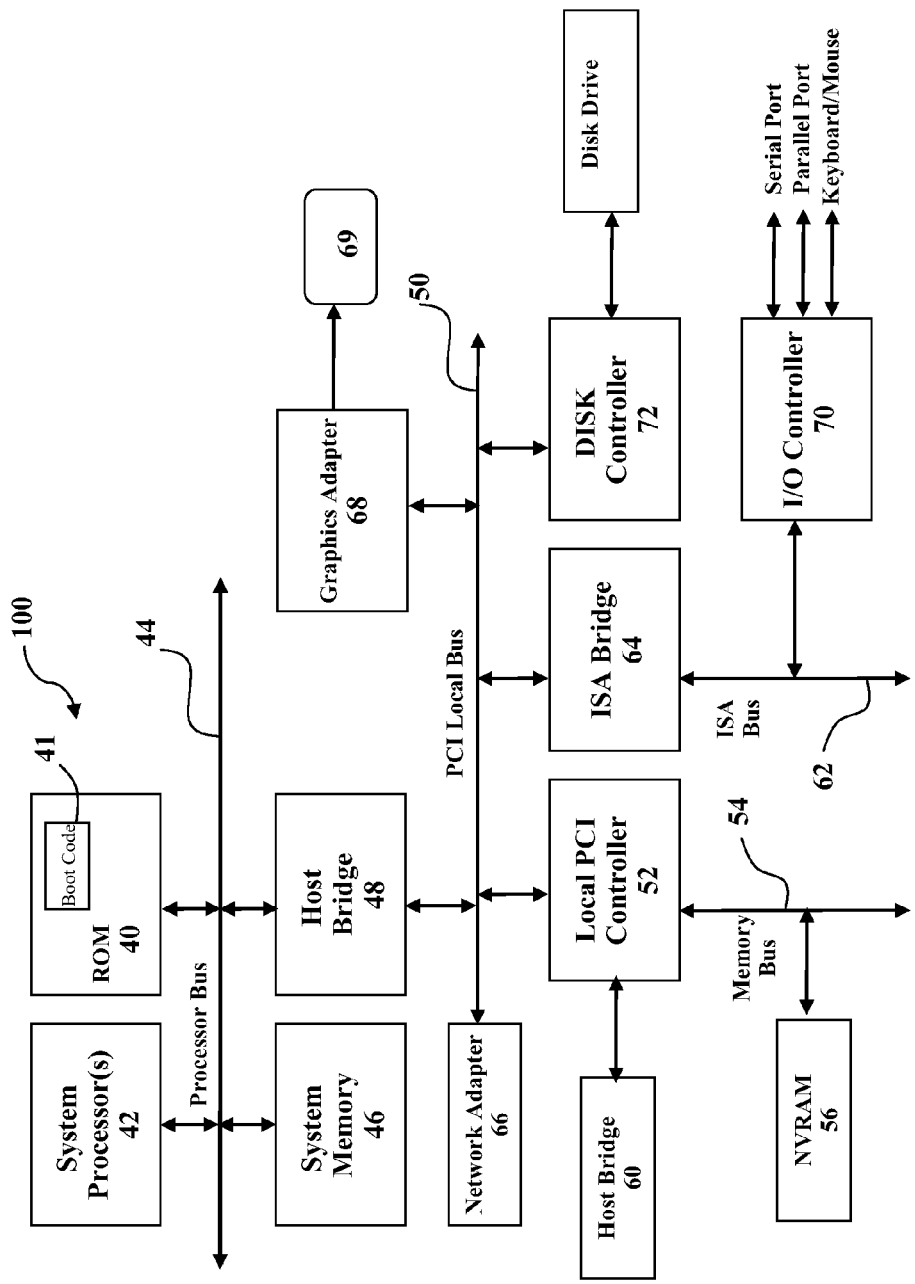
FIG. 1 illustrates an exemplary computer system on which the invention may be implemented.

As will be appreciated by a person skilled in the art, embodiments of the invention may be embodied as a system, method or computer program product. Accordingly, embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the invention may take the form of a computer program product embodied in any tangible medium of expression having computer usable program code embodied in the medium.

Any combination of computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments of the invention provide a method, system and computer program product for purging inactive objects from an entity thereby reducing the size of the entity by producing a thinner entity. In one embodiment, the custom inactive objects are identified in a specified entity the identified custom inactive objects are purged from the specified entity. Once the inactive objects are purged, a report is generated dynamically identifying all the purged inactive objects.

Reference is now made to FIG. 1, which depicts a block diagram of an exemplary embodiment of computer system 100 (any data processing system consisting at least a processor and a memory, capable of processing information/data). The exemplary computer system depicted in FIG. 1 in one embodiment consists of a device having at least a processor and a memory, and for example covers electronic devices such as a laptop or desktop personal computer, a mobile/smart phone, PDAs or the like. As is apparent from the description, however that embodiments of the invention may be implemented in any appropriately configured device, as described herein.

As illustrated in FIG. 1, computer system 100 includes at least one system processor 42, which is coupled to a Read-Only Memory (ROM) 40 and a system memory 46 by a bus 44, preferably a processor bus. System processor 42, may include at least one of the AMD line of processors produced by AMD Corporation or a processor produced by INTEL Corporation or a processor produced by International Business Machines Corporation, such as a POWER processor, and is typically a general-purpose processor that executes boot code 41 stored within ROM 40 at power-on and thereafter processes data under the control of an operating system (not explicitly shown in the figure) and application software (not explicitly shown in the figure) stored in system memory 46. System processor 42 is coupled via bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a as a keyboard, mouse, serial and parallel ports, et cetera. A disk controller 72 connects a disk drive with PCI local bus 50. The USB Bus and USB Controller (not explicitly shown in the figure) are part of the Local PCI controller 52.

Figure 2:
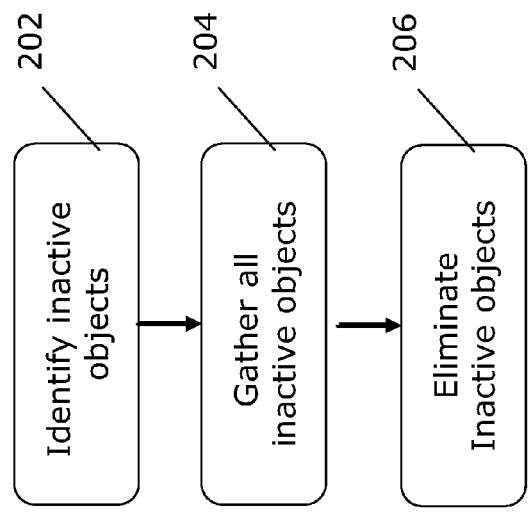
FIG. 2 illustrates an exemplary embodiment method of identifying and purging inactive objects from entities real-time.

FIG. 2 is an exemplary embodiment of the method in accordance with the embodiment of the invention for purging inactive objects from an entity. In Step 202 all inactive objects in an entity are identified. In one embodiment the inactive objects may be listed or selected by the user. In a further embodiment, based on the usage of the objects within the entity, the inactive objects over a period of time may be marked and selected. Once these inactive objects have been identified, all inactive objects within the entity may gathered together.

It should be obvious to a person skilled in the art that objects can follow a parent child relationship. If a particular object within a node in the tree is identified as inactive, then all children from that node proceeding further will also be inactive objects. Once the inactive objects are gathered as illustrated in step 204, the inactive objected identified are deleted in step 206, thereby making the size of the entity smaller and providing better efficiency.

Figure 3:
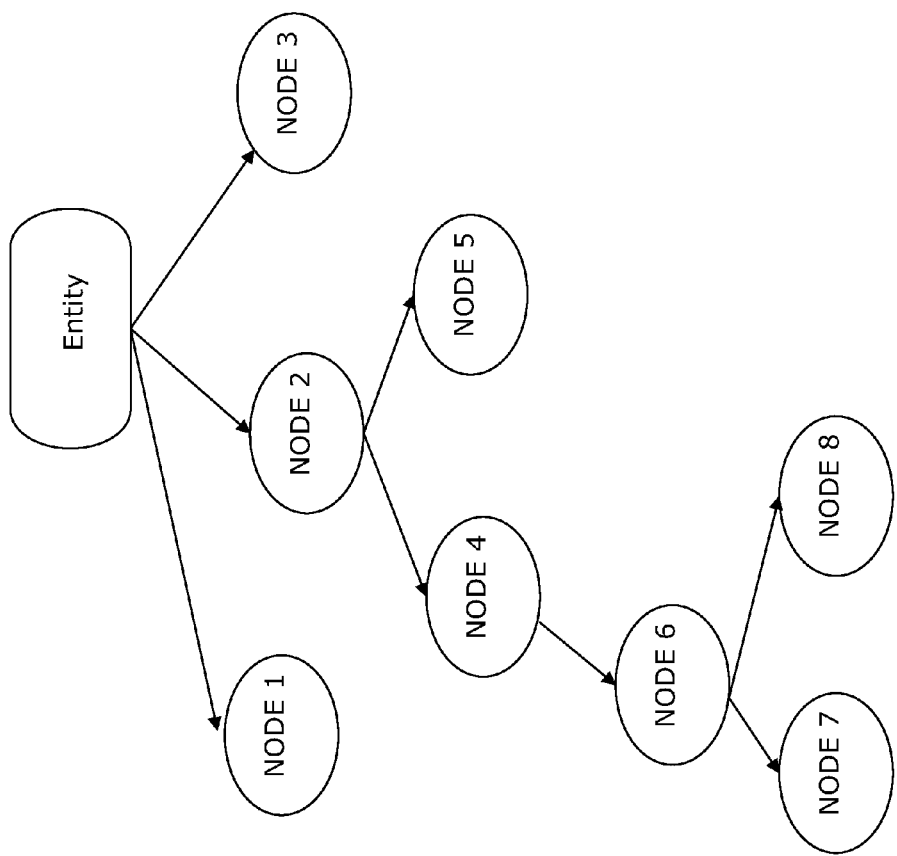
FIG. 3 illustrates an exemplary embodiment of a tree structure of the objects within an entity.

As illustrated in FIG. 3, which is an exemplary embodiment of a relationship between the objects in a entity. As an exemplary embodiment a tree structure is illustrated and it should be obvious to one skilled in the art that other structures fall within the scope of the embodiments of this invention. As illustrated in FIG. 3, the entity has 8 nodes in a patent child relationship. Node 1, Node 2 and Node 3 can be classified as the patent nodes. Again for illustrative purpose only, Node 2 is selected and has two children Node 4 and Node 5. Node 4 further branches to Node 6, and Node 6 has two children Node 7 and Node 8.

To illustrate how the invention works, if Node 8 and Node 3 are identified as an inactive node, then Node 8 and Node 3 are deleted from the entity. In another embodiment if Node 6 is determined to be inactive, then automatically the children node, Node 7 and Node 8 are also inactive and all children node down the tree structure from Node 6 will be deleted. Therefore by identifying inactive objects in an entity and deleting such inactive node, the size of the entity can be reduced and also the inactive nodes need not be processed any longer.

In another embodiment, the nodes may be records in a database and each of the records may have several associated objects. Once the inactive objects are identified and deleted, the processing of the database records becomes faster and also results in freeing up the space occupied by such inactive objects. It should be obvious to one skilled in the art the method of FIG. 2 may be carried out in a system as depicted in FIG. 1.

While it is apparent that the invention herein disclosed is well calculated to fulfill the objectives discussed above, it will be appreciated that numerous modifications and embodiments may be devised by those skilled in the art, and it is intended that the appended claims cover all such modifications and embodiments as fall within the true spirit and scope of the present invention.

Reference throughout this specification to "one embodiment" or "an embodiment" or the like is intended to mean that a particular feature, structure, or characteristic described in connection with the exemplary embodiment is included in at least one embodiment of the invention. Thus, appearances of the phrases "in one embodiment" or "in an embodiment" or the like in various places throughout this specification are not necessarily all referring to the same embodiment.

What is claimed is:

1. A method comprising:

identifying, in an entity, multiple parent nodes and at least one child node proceeding from at least one of the multiple parent nodes in a parent-child relationship, said identifying carried out via a module executing on a hardware processor;

identifying inactive objects in the entity, wherein said inactive objects include an inactive parent node and each child node proceeding from the inactive parent node in a parent-child relationship, wherein said inactive objects are identified based on usage of the objects over a period of time, and wherein said identifying is carried out via a module executing on a hardware processor;

purging the inactive objects from the entity to generate a new version of the entity including only active objects, said purging carried out via a module executing on a hardware processor; and generating a log of said inactive objects purged from the entity.

2. The method as claimed in claim 1, further comprising:
gathering the inactive objects; and
checking if the inactive objects have been inactive based on predefined criteria.

3. The method as claimed in claim 1, wherein the objects within the entity have a parent-child relationship.

4. The method as claimed in claim 1, wherein the entity may comprise at least one of a structured or unstructured metadata format.

5. The method as claimed in claim 4, wherein the entity may comprise a database.

6. The method as claimed in claim 4, wherein the entity may comprise a set of fields linked to each other.

7. A system comprising at least a processor and a memory configured for:

identifying, in an entity, multiple parent nodes and at least one child node proceeding from at least one of the multiple parent nodes in a parent-child relationship;

identifying inactive objects in the entity, wherein said inactive objects include an inactive parent node and each child node proceeding from the inactive parent node in a parent-child relationship, wherein said inactive objects are identified based on usage of the objects over a period of time;

purging the inactive objects from the entity to generate a new version of the entity including only active objects; and generating a log of said inactive objects purged from the entity.

8. The system as claimed in claim 7, further configured for gathering the inactive objects; and checking if the inactive objects have been inactive based on predefined criteria.

9. The system as claimed in claim 7, wherein the objects within the entity have a parent-child relationship.

10. The system as claimed in claim 7, wherein the entity may comprise at least one of a structured or unstructured metadata format.

11. The system as claimed in claim 10, wherein the entity may comprise a database.

12. The system as claimed in claim 10, wherein the entity may comprise a set of fields linked to each other.

* * * * *